(12) United States Patent
Kahraman et al.

(10) Patent No.: US 11,976,608 B2
(45) Date of Patent: May 7, 2024

(54) PISTON FOR AN INTERNAL COMBUSTION ENGINE AND METHOD FOR PRODUCING THE PISTON

(71) Applicant: Mahle International GmbH, Stuttgart (DE)

(72) Inventors: Hakan Kahraman, Ulm (DE); Peter Winkler, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 17/707,938

(22) Filed: Mar. 29, 2022

(65) Prior Publication Data
US 2022/0316422 A1    Oct. 6, 2022

(30) Foreign Application Priority Data
Mar. 30, 2021   (DE) .......................... 102021203241.9

(51) Int. Cl.
*F02F 3/22* (2006.01)
*B23K 26/28* (2014.01)
(Continued)

(52) U.S. Cl.
CPC ................ *F02F 3/22* (2013.01); *B23K 26/28* (2013.01); *F01P 3/10* (2013.01); *F02F 3/28* (2013.01); *B23K 2101/003* (2018.08)

(58) Field of Classification Search
CPC ...... F02F 3/003; F02F 3/22; F02F 3/28; F02F 3/0015; F02F 3/0076; F02F 2003/0061; F16J 1/005; F01P 3/10; F01P 3/06; B23P 15/08; B23P 15/10; B23K 26/28; B23K 2101/003
See application file for complete search history.

(56) References Cited

U.S. PATENT DOCUMENTS 6,477,941 B1 *   11/2002   Zhu .......................... F02F 3/003
                                                  92/186
8,065,985 B2 *   11/2011   Schneider ........... F02B 23/0696
                                                  123/41.35
(Continued)

FOREIGN PATENT DOCUMENTS

CN   102859165 A   1/2013
CN   103124841 A   5/2013
(Continued)

OTHER PUBLICATIONS

German Search Report for DE-102021203241.9, dated Sep. 9, 2021.
Chinese First Office Action and Search Report dated Dec. 25, 2025 for Chinese Patent Application No. 202210323039.1.

*Primary Examiner* — Grant Moubry
(74) *Attorney, Agent, or Firm* — Fishman Stewart PLLC (57) ABSTRACT

A piston for an internal combustion engine and a method for producing a piston are disclosed. The piston includes an upper piston part and a lower piston part that together delimit a circumferential cooling channel for receiving a cooling medium both radially inside and radially outside. The upper piston part and the lower piston part are connected to one another via a radially outer weld connection and a radially inner weld connection. The radially outer weld connection includes a radially outer weld bead that projects radially inwards into the cooling channel for forming a deflection element for the cooling medium received in the cooling channel.

20 Claims, 3 Drawing Sheets

(51) Int. Cl.
*F01P 3/10* (2006.01)
*F02F 3/28* (2006.01)
*B23K 101/00* (2006.01)

(56) References Cited

U.S. PATENT DOCUMENTS

| | | | |
|---|---|---|---|
| 8,635,982 B2 | 1/2014 | Scharp | |
| 8,955,486 B2 | 2/2015 | Azevedo | |
| 8,973,548 B2 | 3/2015 | Andreas | |
| 9,109,530 B2 | 8/2015 | Bischofberger | |
| 9,308,607 B2* | 4/2016 | Scharp | B23K 20/227 |
| 9,334,957 B2* | 5/2016 | Ribeiro | B23P 15/10 |
| 10,202,936 B2 | 2/2019 | Azevedo | |
| 10,837,400 B2* | 11/2020 | Keller | F02F 3/16 |
| 10,919,109 B2 | 2/2021 | Winkler | |
| 2001/0025568 A1* | 10/2001 | Kemnitz | F02F 3/22 |
| | | | 92/186 |
| 2003/0037671 A1* | 2/2003 | Zhu | F02F 3/003 |
| | | | 92/231 |
| 2009/0220820 A1 | 9/2009 | Kolbe et al. | |
| 2010/0108000 A1* | 5/2010 | Scharp | F02F 3/22 |
| | | | 123/41.35 |
| 2010/0299922 A1* | 12/2010 | Gniesmer | B23K 20/12 |
| | | | 29/888.044 |
| 2011/0132971 A1* | 6/2011 | Kolbe | B23K 33/008 |
| | | | 228/114 |
| 2012/0037113 A1* | 2/2012 | Scharp | B23K 20/12 |
| | | | 123/193.6 |
| 2012/0279390 A1* | 11/2012 | Boczek | B23K 37/053 |
| | | | 92/186 |
| 2013/0000483 A1* | 1/2013 | Scharp | F02F 3/22 |
| | | | 92/176 |
| 2014/0305401 A1* | 10/2014 | Ottliczky | F16J 1/09 |
| | | | 123/193.6 |
| 2015/0226151 A1 | 8/2015 | Emmerich et al. | |
| 2017/0058824 A1* | 3/2017 | Weiss | F02F 3/26 |
| 2018/0202387 A1* | 7/2018 | Wandrie, III | F02F 3/003 |
| 2018/0369955 A1* | 12/2018 | Winkler | B23K 33/006 |
| 2019/0024606 A1 | 1/2019 | Weiss et al. | |
| 2021/0172523 A1* | 6/2021 | Schneider | F02F 3/0015 |

FOREIGN PATENT DOCUMENTS

| | | |
|---|---|---|
| CN | 104246193 A | 12/2014 |
| CN | 107980079 A | 5/2018 |
| CN | 109128483 A | 1/2019 |
| DE | 102005021428 A1 | 11/2006 |
| DE | 10 2008 012 049 A1 | 9/2009 |
| DE | 10 2011 116 332 A1 | 1/2013 |
| DE | 10 2012 008 947 A1 | 11/2013 |
| DE | 10 2013 218 709 A1 | 3/2014 |
| DE | 10 2016 116 046 A1 | 3/2017 |
| WO | 14/159634 A1 | 10/2014 |

\* cited by examiner

PISTON FOR AN INTERNAL COMBUSTION ENGINE AND METHOD FOR PRODUCING THE PISTON

CROSS-REFERENCE TO RELATED APPLICATION

This application claims priority to German Application No. 10 2021 203 241.9 filed on Mar. 30, 2021, the contents of which are hereby incorporated by reference in its entirety.

TECHNICAL FIELD

The invention relates to a piston for an internal combustion engine and to an internal combustion engine having such a piston. The invention, further, relates to a method for producing such a piston.

BACKGROUND

In modern internal combustion engines, pistons are exposed to high mechanical and thermal loads. It is therefore known to provide in conventional pistons a cooling channel through which a cooling medium, in particular oil, can flow. Such a cooling channel is typically arranged near the piston crown since this is where the highest thermal loads occur. During the operation of the piston, the cooling medium received in the cooling channel can absorb and transport heat from the piston material in the region of the combustion bowl but also of the piston crown to a region of the piston that is distant from the combustion bowl or the piston crown. In this way, the combustion bowl and also the piston crown are cooled and consequently thermally relieved.

A piston with cooling channel designed in such a manner is known from DE 10 2011 116 332 A1.

For producing a piston with cooling channel, two blanks are typically used which during the course of the production of the piston are welded together by means of friction welding and, having been welded together, form an upper and a lower piston part of the piston which are integrally bonded to one another.

During the welding process, weld beads can develop in the region of the weld connections between the two blanks and project into the cooling channel in an undesirable manner.

For avoiding such weld beads projecting into the cooling channel, DE 10 2008 012 049 A1 proposes to form the joining surfaces between the blanks so that any weld bead developing during the welding is preferably kept out of the cooling channel.

DE 10 2012 0089 47 A1 by contrast follows the approach of primarily keeping the cooling channel but rather the combustion bowl free of interfering weld beads and for this purpose proposes to accordingly configure the joining surfaces between the blanks so that any weld beads that may occur are directed away from the combustion bowl.

It is an object of the present invention to show new ways in the development of pistons with cooling channel and with two piston parts welded to one another.

This object is solved through the subject of the independent patent claim(s). Preferred embodiments are subject of the dependent patent claims.

SUMMARY

Here, the basic idea of the invention is to specifically form weld beads developing during the welding of two blanks to form a piston so that they can act within the cooling channel as deflection elements for the cooling medium present and accelerated in the cooling channel. Such a weld bead functioning as deflection element is designed so that it deflects the coolant present in the cooling channel—in particular during the successive stroke movements of the piston—at least a part of the cooling medium towards the piston crown, in particular towards the combustion bowl of the piston. In this manner, heat can be increasingly discharged from these regions.

According to the invention it is therefore proposed to provide a piston produced of at least two blanks, which in the assembled state includes an upper piston part and a lower piston part, which are connected to one another by means of a radially inner and a radially outer weld connection, at least in the region of the radially outer weld connection with a weld bead which radially projects towards the inside, i.e. typically towards the centre longitudinal axis of the piston, into the cooling channel. It has been shown that a weld bead arranged at this point brings about in a particularly efficient manner the advantageous deflection of the cooling medium towards the piston crown and/or towards the combustion bowl described above.

In addition to this, a weld bead arranged in the cooling channel in this position brings about that the cooling medium during the course of the stroke movement of the piston generates turbulent flows in the cooling medium, as a result of which the heat exchange with the piston material is advantageously amplified. Because of this, combustion bowl and piston crown are thermally further relieved.

A piston for an internal combustion engine according to the invention includes an upper piston part and a lower piston part that is integrally connected to the upper piston part. Here, the designations "upper" and "lower" relate to an axial direction which can run in particular along a centre longitudinal axis of the piston. When the piston is installed in the combustion chamber of an internal combustion engine, the upper piston part in the case of the piston according to the invention faces the combustion chamber and the lower piston part faces away from the combustion chamber. The upper piston part can comprise a piston crown and a combustion bowl, wherein a bowl edge formed in the piston crown can partly or completely surround the combustion bowl. The two piston parts together delimit a cooling channel which preferably extends along a circumferential direction circulating about a centre longitudinal direction of the piston. The cooling channel serves for receiving a cooling medium, in particular oil, which can absorb heat from the regions of the piston particularly subjected to thermal loads during the operation of the piston—in particular the piston crown and the combustion bowl—and pass on the heat to the piston material further distant from the piston crown and combustion bowl subjected to lower thermal loads. For this purpose, the cooling medium during the operation of the piston, i.e. during a piston stroke, is axially and along the circumferential direction so that during a piston stroke it can thermally come into contact both with the thermally loaded regions of the piston and also with the thermally less loaded regions of the piston at least once, typically multiple times. The said cooling channel, which can typically have an angular geometrical shape, can be delimited both radially inside and also radially outside by the piston material of the piston or of the two piston parts. According to the invention, the upper piston part and the lower piston part are integrally connected to one another by means of a radially outer weld connection and by means of a radially inner weld connection. The weld connections can be friction-welded connections. The terms "radially outside" and "radially inside" preferably relate to a radial direction which extends perpendicularly away from the centre longitudinal axis of the piston and orthogonally both to the axial direction and also to the circumferential direction. According to the invention, at least the radially outer weld connection includes a radially outer weld bead which for forming a (first) deflection element for the cooling medium present in the cooling channel projects radially to the inside at least partially into the cooling channel.

In a preferred embodiment, the radially inner weld connection also includes a radially inner weld bead extending radially to the inside away from the cooling channel. By means of such an additional radially inner weld bead on the radially inner weld connection, additional turbulent flows can be generated in the cooling medium during the movement of the piston, which improve the heat exchange of the cooling medium with the material of the piston. Apart from this, the cooling medium can be deflected on the weld bead provided on the radially inner weld connection, similarly to the radially outer weld bead, towards the piston crown and towards the combustion bowl. The radially inner weld bead thus also follows the operating principle of a deflection element for the cooling medium present in the cooling channel.

In a particularly preferred embodiment, the radially inner and the radially outer weld connection and thus also the radially inner and the radially outer weld bead are arranged at the same axial height of the piston. In this way, both weld beads can be used in order to form a radial narrowing in the cooling channel. In connection with the so-called shaker effect, the cooling medium accelerated in the cooling channel in this manner is particularly effectively mixed through and by means of the said narrowing also accelerated specifically towards the piston crown and towards the combustion bowl. This has the consequence that the cooling medium per piston stroke is particularly often guided to the wall portions of the cooling channel subjected to particularly high thermal load, which are arranged in particular in the region of the piston crown or of the piston bowl. In this way, particularly much heat is discharged from the piston crown or from the combustion bowl.

In a preferred embodiment alternative thereto, the radially inner weld connection—and thus, if present, also the radially inner weld bead—can be arranged axially offset to the radially outer weld connection and or to the radially outer weld bead. This allows placing the radially inner weld bead axially nearer to the piston bowl subjected to particularly high thermal load. Because of this, the radially inner weld bead projecting into the cooling channel can assume the function of a cooling rib for the piston material of the piston. This measure also brings about an improved heat discharge from the piston bowl by means of the coolant.

From what was said above it follows that it proves to be particularly advantageous when the radially inner weld connection, in particular the radially inner weld bead, is arranged in the region of the piston crown of the piston; since in this case, heat can be particularly effectively discharged from the piston crown. Alternatively to this, the radially inner weld bead can be directly arranged in the region of the combustion bowl of the piston. In this case, heat is particularly effectively discharged from the combustion bowl that is likewise subjected to high thermal loads. Particularly preferably, a first weld bead volume of the radially outer weld bead is larger than a second weld bead volume of the radially inner weld bead. In this way, a particularly large amount of cooling medium can be deflected towards the combustion bowl.

As already explained above, it proves to be particularly advantageous fluidically when at least the radially outer weld bead, preferably both the radially outer and also the radially inner weld bead, form a radial narrowing of the cooling channel, which divides the cooling channel into a narrowing zone and into an axially upper and an axially lower channel zone. Here, the narrowing zone is arranged between the axially upper and the axially lower channel zone. By means of this variant, a particularly effective restriction of the cooling medium towards the piston crown or towards the combustion bowl is achieved.

A further embodiment proves to be particularly advantageous in which a volume of the upper channel zone amounts to at least 40% of a volume of the total cooling channel. By means of such a geometrical configuration of the cooling channel a particularly large portion of the cooling medium present in the cooling channel can be directed towards the piston crown and towards the combustion bowl. It has been shown that a mixing-through of the cooling medium circulating in the cooling channel in the circumferential direction takes place particularly effectively when—in the presence of the radially outer weld bead, but not of a radially inner weld bead—the radial width of the cooling channel in the region of the narrowing amounts to up to half, preferably maximally ⅓, of a maximum radial width of the cooling channel.

Particularly practically, at least one of the mentioned weld beads is formed as deflection element for the cooling medium present in the cooling channel. This is particularly true for both weld beads, i.e. both for the radially outer weld bead and also for the radially inner weld bead. To this end, the respective weld bead can be formed in particular as an extension with a suitable geometrical shape projecting from the weld connection into the cooling channel. Here, the term "deflection element" is to mean that the weld bead has the characteristic of deflecting the coolant when flowing through the cooling channel, namely preferentially so that it is preferably deflected towards the piston crown and—alternatively or additionally—towards the combustion bowl. Additionally, such a deflection element can be designed in order to generate in the cooling medium flow turbulences, i.e. a turbulent flow, which promotes the heat exchange.

The invention further relates to an internal combustion engine having at least one combustion chamber, in which a piston according to the invention introduced above is adjustably arranged along an axial direction. The advantages of the piston according to the invention explained above therefore apply also to the internal combustion engine according to the invention.

In addition, the invention relates to a method for producing a piston, in particular the piston according to the invention explained above.

The basic idea of the method according to the invention is to configure, for the reasons explained above, the joining surfaces of two blanks, which are welded together for forming a piston with an upper and a lower piston part, so that during the course of the welding of the two blanks a (radially outer) weld bead projecting into the cooling channel is created at least on the radially outer weld connection.

The method according to the invention includes at least one first measure a) and a second measure b). According to the first measure a), a first and a second blank are provided, which after completion of the production method can together form a piston having an upper and having a lower piston part. Both blanks each comprise a radially outer joining surface and a radially inner joining surface. Thus, altogether four joining surfaces are provided on the two joining partners so that from each two joining surfaces of the two joining partners assigned to one another a respective weld connection can be formed. It is also provided to generate two weld connections.

On at least one of the two radially outer joining surfaces, preferentially on both radially outer joining surfaces, a (first) weld bead steering element is or will be provided with the method according to the invention. Such a (first) weld bead steering element serves being able to deflect a weld bead, created during the course of the welding of the joining surfaces, into the cooling channel in a specific manner. Such a welding of the joining surfaces of the blanks with the method according to the invention takes place in the second measure b). According to measure b), the two blanks are welded together at the joining surfaces, preferentially by means of friction-welding. After completed welding, the first blank forms an upper piston part and the second blank a lower piston part of the piston. According to the invention, the welding takes place in such a manner that during the course of the welding process at least on the two radially outer joining surfaces a radially outer weld bead is formed, which was deflected from the (first) weld bead steering element so that, after the welding, it projects into a cooling channel which is delimited by the two blanks or the piston parts formed from the two blanks by the welding process. Following the welding, the piston—in particular the piston according to the invention explained above is complete.

Prior to the welding according to measure b), the two radially outer joining surfaces preferably delimit a radially outer gap tapering radially to the outside or radially to the inside, which forms the (first) weld bead steering element. The said radially outer gap, which tapers radially to the inside brings about that during the welding process the weld bead developing during the welding process is steered at least primarily, in an extreme case even completely, into the cooling channel so that, following the completion of the welding process, it projects into the cooling channel.

Alternatively to this it is conceivable that the (first) weld bead steering element is formed by a recess provided in the region of the two joining surfaces or by a projection provided in the region of the two joining surfaces. With suitable arrangement of the recess or of the projection, a weld bead steering element formed in this manner also brings about the desired deflection into the cooling channel of the weld bead generated during the welding.

According to an advantageous further development of the method, a—radially inner—weld bead can also be formed on the two radially inner joining surfaces during the course of the welding of the two blanks during the welding process when the weld bead steering element proposed above is also provided on at least one of the two inner joining surfaces, preferentially on both inner joining surfaces. Prior to the welding according to measure b), the two radially inner joining surfaces can thus delimit a radially inner gap tapering radially to the inside, which forms the second weld bead steering element. In this case, the weld bead developing on the two inner joining surfaces during the course of the welding process is deflected from a second weld bead steering element so that after the welding it projects radially to the inside out of the cooling channel delimited by the two piston parts and into the combustion chamber bowl. There, the weld bead is accessible and can be removed during the course of a reworking of the piston by machining, preferably by turning.

Prior to the welding according to measure b), the two radially inner joining surfaces can alternatively thereto delimit a gap tapering radially to the outside which forms the second weld bead steering element. In this variant, the radially inner weld bead developing during the welding process on the two radially inner joining surfaces can be deflected from the second weld bead steering element so that after the welding it projects radially to the outside, i.e. into the cooling channel.

Embodiments, with which the two radially inner joining surfaces and the two radially outer joining surfaces form weld bead steering elements in the same direction prove to be particularly preferable, i.e. that these bring about that during the welding the radially inner weld bead and the radially outer weld bead are completely or predominantly steered in the same direction, i.e. both to radially inside or both to radially outside. By way of this, the weld bead is steered on one side—i.e. radially inside or radially outside—into the cooling channel whereas it is steered out of the cooling channel on the other side. The remaining cooling channel cross-section can thus be formed in the shape of a kidney and be provided with a central one-sided narrowing which is delimited by a weld bead of a certain size on the one side and by a weld bead on the radially opposite side with a size that is reduced compared with the former, wherein the latter weld bead can also be absent entirely. This configuration favours the forming of a swirl or roll-type of flow in the coolant in the upper or lower part of the cooling channel after it has passed through the narrowing, and further makes possible a high flow velocity of the coolant along the channel surface and because of this brings about an amplified heat transfer. Here, a dome-shaped section in particular in the piston crown-side part of the cooling channel and a tangential entry of the flow into the dome shape is particularly advantageous, by way of which flow resistance is avoided.

Further important features and advantageous of the invention are obtained from the subclaims, from the drawing and from the associated figure description by way of the drawings.

It is to be understood that the features mentioned above and still to be explained in the following cannot only be used in the respective combination stated, but also in other combinations or by themselves without leaving the scope of the present invention.

Preferred embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
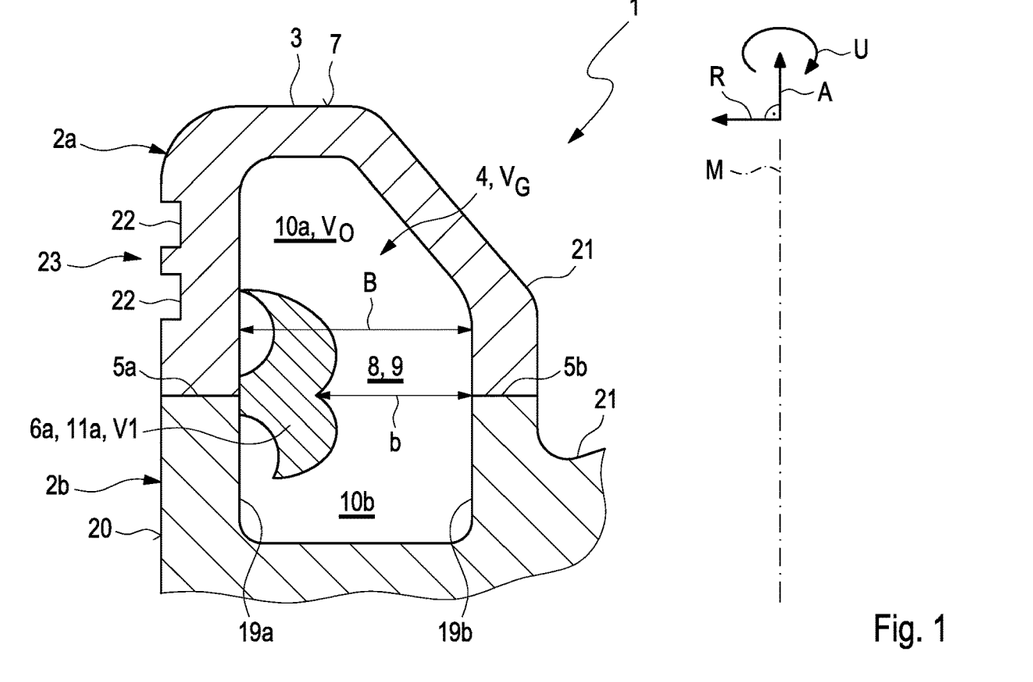
FIG. 1 an example of a piston according to the invention with a weld bead only provided radially outside, FIG. 2 a further development of the example of FIG. 1, in which additionally to the radially outer weld bead a radially inner weld bead is also provided, which is arranged axially at the same height as the radially outer weld bead, FIG. 3 a variant of the example of FIG. 2, in which the two weld beads are arranged axially offset from one another, i.e. at a different axial height, FIG. 4 a representation illustrating the assembly of the piston according to the invention, in which two blanks are shown prior to the welding to form a piston as shown in the FIGS. 1 and 2, FIG. 5 a variant of the arrangement according to FIG. 4, which shows two blanks prior to the welding to form a piston and by means of which in the cooling channel of the same the only or largest weld bead can be steered from the radially inner joining surface into the cooling channel.

FIG. 1 shows an example of a piston 1 according to the invention in an extract and in a sectional representation along an axial direction A of the piston 1. The axial direction A extends along a centre longitudinal axis M of the piston 1. A radial direction R extends perpendicularly to the axial direction A away from the centre longitudinal axis M. A circumferential direction U extends perpendicularly to the axial direction A and also perpendicularly to the radial direction R and circulates round about the centre longitudinal axis M. The piston 1 can be adjustably arranged along the axial direction A in a combustion chamber of an internal combustion engine (not shown in the figures). The piston 1 includes an upper piston part 2a and a lower piston part 2b which are integrally connected to one another. As piston material for the piston 1, a steel material and, alternatively or additionally, a light metal material can be used. An axial front side 7 of the first piston part 2a facing away from the second piston part 2b forms a piston crown 3 which, radially to the inside, merges into a combustion bowl 21, which in the example of FIG. 1 is partially formed by the upper piston part 2a and partially by the lower piston part 2b. In the installation state in the combustion chamber of the internal combustion engine, the piston crown 3 and the combustion bowl 21 of the piston 1 delimit the combustion chamber of the internal combustion engine in the axial direction A.

FIG. 1 shows the piston 1 in an assembled state. In this state, the piston 1 is formed in one piece. Here, the two piston parts 2a, 2b delimit a closed angular cooling channel 4 which extends along the circumferential direction U and is completely surrounded by the two piston parts 2a, 2b. Thus, the cooling channel 4 is jointly delimited in particular both radially outside and also radially inside by the two piston parts 2a, 2b. The cooling channel 4 serves for receiving a cooling medium, in the exemplary scenario in the form of oil.

In the example of FIG. 1, the two piston parts 2a, 2b are integrally connected to one another by means of a radially outer weld connection 5a and by means of a radially inner weld connection 5b. The radially outer weld connection 5a is arranged in a radially outer limit 19a of the cooling channel 4, which is formed both by the upper and also by the lower piston part 2a, 2b.

Accordingly, the radially inner weld connection 5b is arranged in a radially inner limit 19b of the cooling channel 4, which is formed both by the upper and also by the lower piston part 2a, 2b. The radially inner limit 19b and thus also the radially inner weld connection 5b are arranged in the region of the combustion bowl 21 of the piston 1. The radially outer limit 19a is arranged in the region of a ring belt 22 of the piston, in which on an outer circumference 20 of the piston 1 receiving grooves 22 axially spaced apart from one another can be arranged for receiving a respective piston ring (not shown). With respect to the radial direction R, the radially outer limit 19a with the radially outer weld connection 5a is further distant from the centre longitudinal axis M than the radially inner limit 19b with the radially inner weld connection 5b. The two weld connections 5a, 5b each also have a closed angular geometry and each extend along the circumferential direction U. Both weld connections 5a, 5b can be created by means of friction-welding, i.e. these are so-called friction-welded connections.

In the example of FIG. 1, the radially outer weld connection 5a includes a radially outer weld bead 6a. As indicated in FIG. 1, the radially outer weld bead 6a projects into the cooling channel 4 for forming a first deflection element 11a for the oil present in the cooling channel 4 and accelerated in the cooling channel 4 during the operation of the piston—i.e. while piston strokes are executed—radially to the inside, i.e. against the radial direction R. By contrast, in the example of FIG. 1, a weld bead projecting into the cooling channel 4 is absent with the radially inner weld connection 5b.

As is illustrated by the longitudinal section of FIG. 1, the radially outer weld bead 6a forms a radial narrowing 8 of the cooling channel 4. This narrowing 8 divides the cooling channel 4 along the axial direction A into three zones, namely into a narrowing zone 9 and into an axially upper and into an axially lower channel zone 10a, 10b. The narrowing zone 9 is arranged along the axial direction A between the axially upper and the axially lower channel zone 10a, 10b. The axially upper channel zone 10a axially faces the piston crown 3 and is delimited by the upper piston part 2a. The axially lower channel zone 10b faces axially away from the piston crown 3 and is delimited by the lower piston part 2b. In the shown longitudinal section along the axial direction A, a radial width b of the cooling channel 4 in the region of the narrowing 8 amounts to maximally 50% of a maximum width B of the cooling channel 4 in the region of the axially upper channel zone 10a. A volume $V_O$ of the upper channel zone 10a can practically amount to at least 40% of a volume $V_G$ of the entire cooling channel 4.

Figure 2:
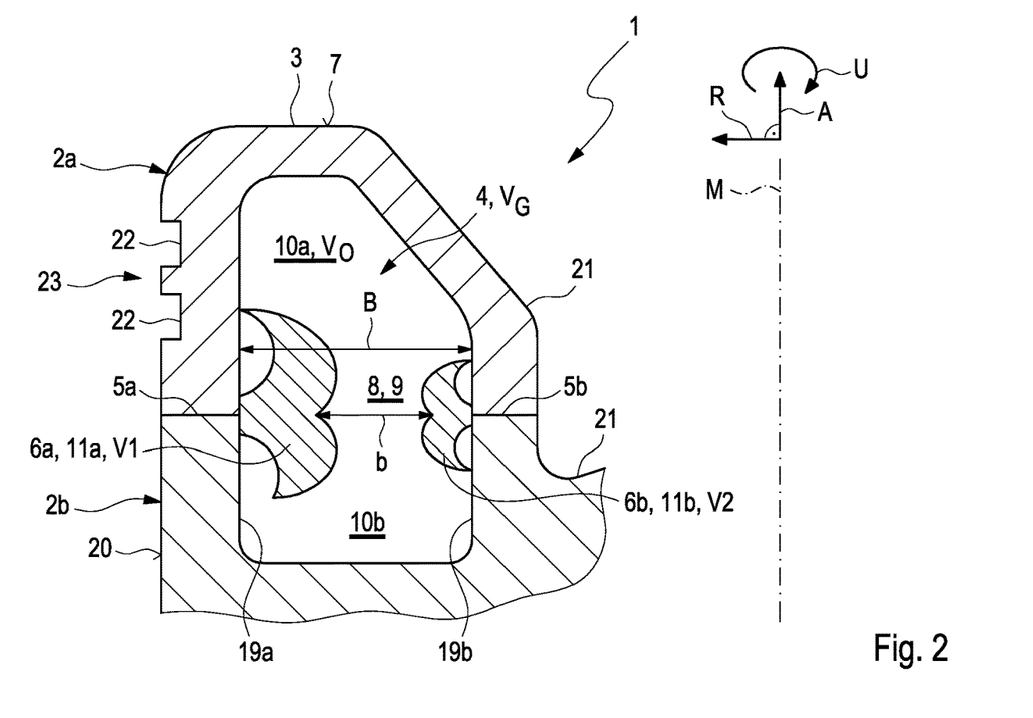

The FIG. 2 shows a variant of the example of FIG. 1. This variant differs from the example of FIG. 1 in that the radially inner weld connection 5b, which can be realised as a friction-welded connection, also includes a radially inner weld bead 6b, which along the radial direction R projects radially to the outside into the cooling channel 4. The radially inner weld bead 6b is arranged as part of the radially inner weld connection 5b in the region of the combustion bowl 21. The radially inner weld bead 6b analogously to the first deflection element 11a forms a second deflection element 11b for the oil present in the cooling channel 4. The radially outer weld bead 6a projecting into the cooling channel 4 has a first weld bead volume V1. The radially inner weld bead 6b projecting into the cooling channel 4 accordingly has a second weld bead volume V2.

As illustrated by FIG. 2, the first weld bead volume V1 is practically larger than the second weld bead volume V2. Preferably, the radially inner and the radially outer weld connection 5a, 5b and thus also the radially inner and the radially outer weld bead 61, 6b can thus be arranged along the axial direction A at the same axial height H of the piston 1.

In the example of FIG. 2, both the radially outer weld bead 6a and also the radially inner weld bead 6b form—analogously for example to FIG. 1—a radial narrowing 8 of the cooling channel 4 which divides the cooling channel 4 into the narrowing zone 9 already explained by way of FIG. 1 and into an axially upper and an axially lower channel zone 10a, 10b. Here, analogously to the example of FIG. 1, the narrowing zone 9 is also arranged along the axial direction A between the axially upper and the axially lower channel zone 10a, 10b. The axially upper channel zone 10a axially faces the piston crown 3 and is delimited by the upper piston part 2a. The axially lower channel zone 10b faces axially away from the piston crown 3 and is delimited by the lower piston part 2b.

In the example of FIG. 2, in which in contrast with the example of FIG. 2, both weld beads 6a, 6b jointly form the narrowing 8, the radial width b of the cooling channel 4 in the region of the narrowing 8 amounts to maximally ⅓ of the maximum radial width B of the entire cooling channel 4. In the example of FIG. 2, the volume $V_O$ of the upper channel zone 10a can amount to at least 40% of the total volume of the entire cooling channel 4.

Figure 3:
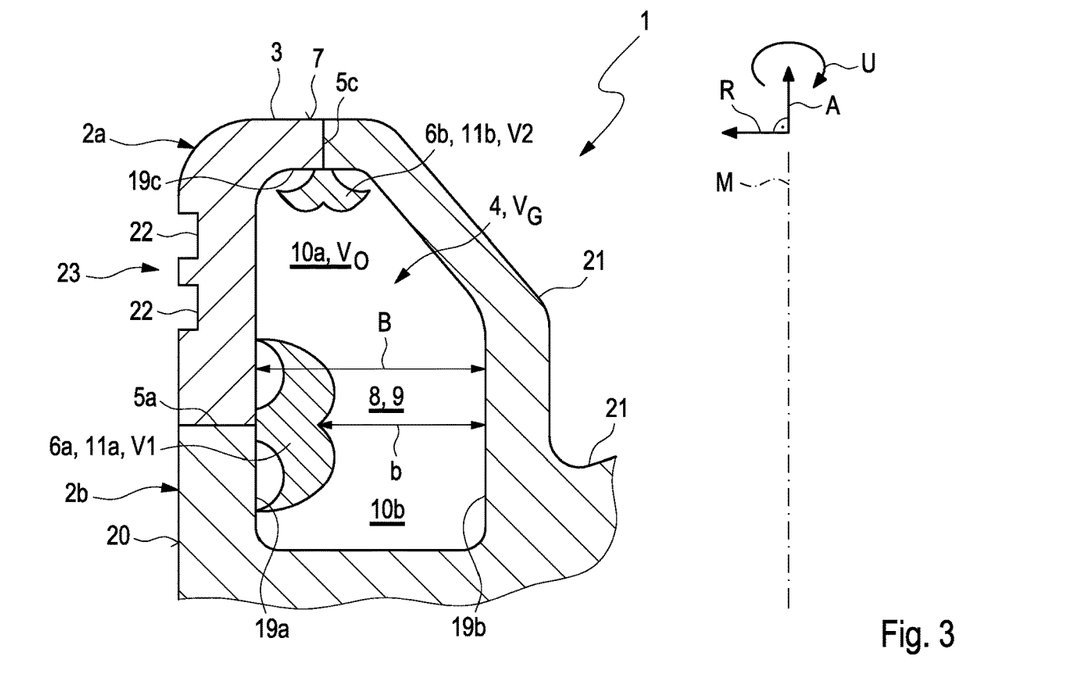

FIG. 3 illustrates an alternative variant to the example of FIG. 2. The example of FIG. 3 differs from that of FIG. 2 in that—in contrast with the example of FIG. 2—the radially inner weld connection 5b with the radially inner weld bead 6b along the axial direction A is arranged offset towards the top offset to the radially outer weld connection 5a or to the radially outer weld bead 6a.

The radially inner weld connection 5b or the radially inner weld bead 6b is not arranged, as in the example of FIG. 2, in the region of the radially inner limit 19b of the cooling channel 4 and thus in the region of the combustion bowl 21, but in the region of an axially upper limit 19 of the cooling channel 4. This axially upper limit 19c delimits the piston 1 in the region of the piston crown 3 axially and is arranged between the radially outer limit 19a and the radially inner limit 19b. Apart from this, the axially inner weld connection 5c is arranged in the region of the piston crown 3. Thus, the combustion bowl 21 in contrast with the example of FIGS. 1 and 2 is completely formed by the lower piston part 2b.

In the following, the method according to the invention for producing or assembling the piston 1 explained above is explained by way of FIG. 4. The piston 1 is produced from a first and second blank 12a, 12b which are welded together for forming the piston 1 with cooling channel 4 and, following the welding, form an upper and a lower piston part 2a, 2b of the now integral or one-piece piston.

Figure 4:
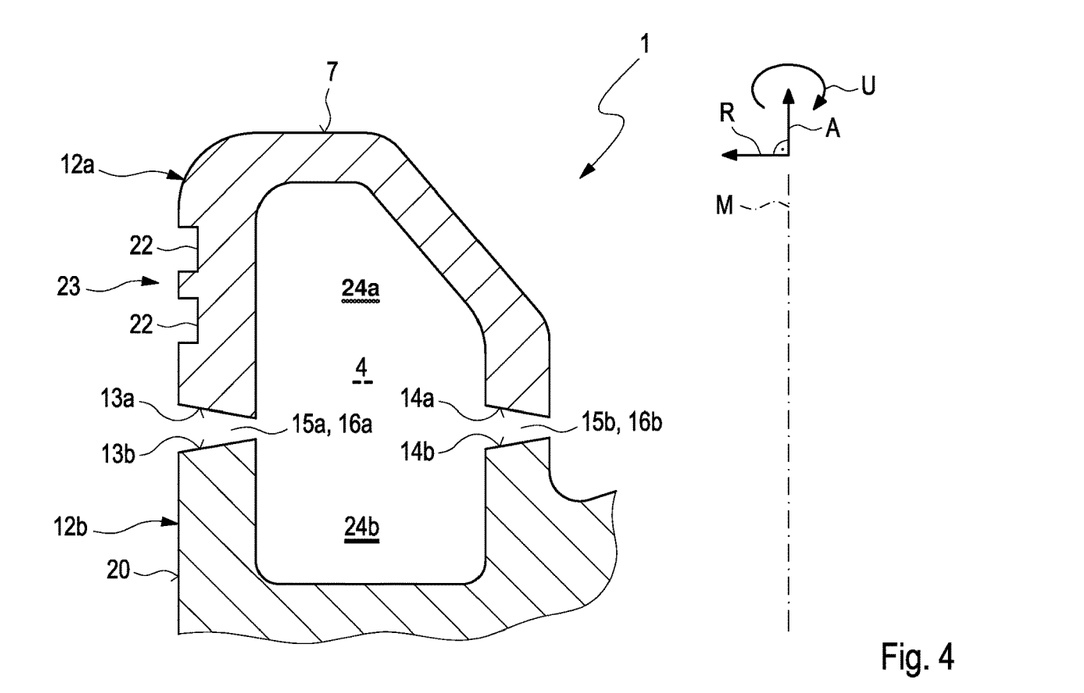

FIG. 4 shows the two blanks 12a, 12b prior to the welding. According to a first measure a) of the method, the first and the second blank 12a, 12b are provided as shown in FIG. 4. Both blanks 12a, 12b each comprise a radially outer 13a, 13b and a radially inner joining surface 14a, 14b. By way of a first and second intermediate space 24a, 24b respectively formed in the first and second blank 12a, 12b radially between the joining surfaces 13a, 13b, 14a, 14b, the cooling channel 4, in the welded state of the two blanks 12a, 12b, can be formed for receiving oil.

According to a second measure b), both blanks 12a, 12b are joined to one another at the joining surfaces 13a, 13b, 14a, 14b by means of friction-welding to form the piston 1. The piston 1 as shown in FIG. 2 with the upper piston part 2a formed from the first blank 12a and with the lower piston part 2b formed from the second blank 12a is created. Here, a first weld bead steering element 16a can be formed on the radially outer joining surfaces 13a, 13b as indicated in FIG. 4. Likewise, a second weld bead steering element 16b can be formed on the radially inner joining surfaces 14a, 14b.

As illustrated by FIG. 4, the two radially outer joining surfaces 13a, 13b delimit, prior to the welding according to measure b), a radially outer gap 15a tapering along the radial direction R towards the inside, which forms the said first weld bead steering element 16a. Prior to the welding according to measure b), the two radially inner joining surfaces 14a, 14b accordingly delimit a radially inner gap 15b tapering along the radial direction R towards the inside, which forms the second weld bead steering element 16b.

The friction-welding takes place with the help of the two weld bead steering elements 16a, 16b in such a manner that a radially outer weld bead 6a forms during the welding process on the two radially outer joining surfaces 13a, 13b, which is deflected from the first weld bead steering element 16a so that, after the welding, it projects into the cooling channel 4 delimited by the two piston parts 2a, 2b.

In variants of the example, which are not shown in more detail in the figures, the joining surfaces, which form the radial gap between them, can also be formed other than conically or radially flat. Thus, at least one or even both joining surfaces can for example comprise a chamfer radially inside or radially outside which offers the space provided for receiving the bead. Further it is conceivable that the first weld bead steering element 16a and—alternatively or additionally—the second weld bead steering element 16b is not formed by a radial gap, but by a recess configured in any way (not shown) or by a projection formed in the region of the two joining surfaces 13a, 13b, 14a, 14b (not shown).

After conclusion of the welding process according to measure b) the piston 1 according to the invention is produced, which can form in particular as shown for example in FIG. 2 or 3. In both cases, the first blank 12a forms the upper piston part 2a and the second blank 12b the lower piston part 2b of the piston 1. Obviously it is possible by means of the method according to the invention to produce a piston 1 with which the positions of the two weld connections diverge from the two examples according to the FIGS. 1 and 2.

Figure 5:
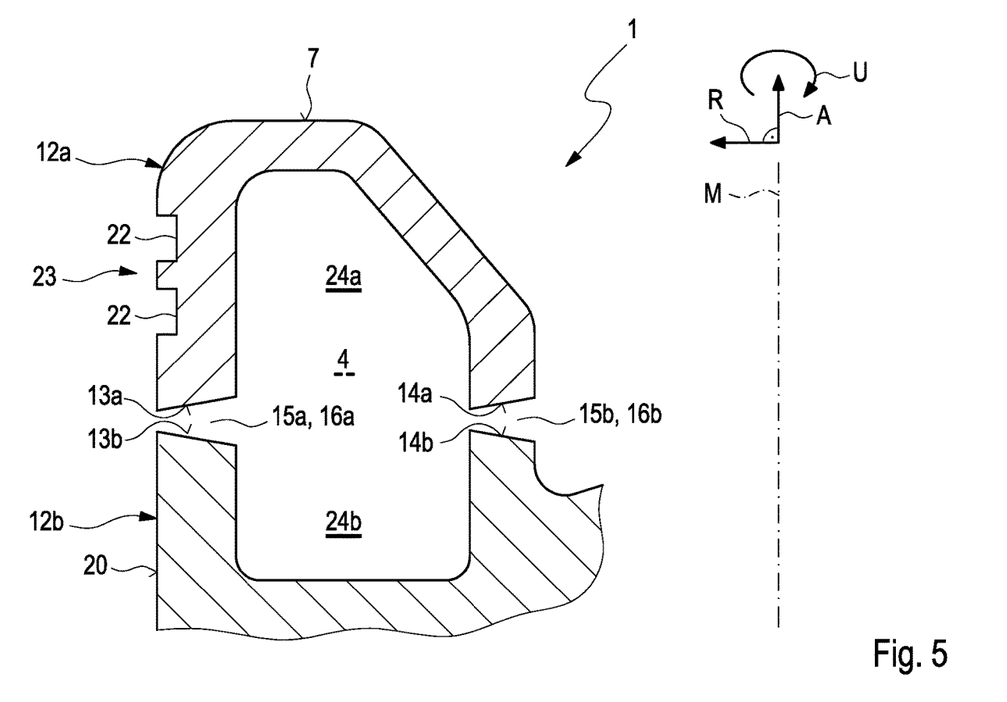

If the cooling channel 4 on the radially outer weld connection 5a is to be kept clear of a weld bead this is also possible by means of the method according to the invention. To this end, the two radially inner and outer joining surfaces 13a, 13b, 14a, 14b provided in measure a) can be formed and oriented to one another so that, prior to the welding according to measure b), they each delimit a gap tapering radially to the outside, i.e. away from the centre longitudinal axis M, as shown in FIG. 5. A gap formed in such a manner forms a weld bead steering element which deflects the radially outer weld bead created during the welding so that following the welding it projects radially to the outside, i.e. out of the cooling channel 4 and can thus be easily removed during the course of a reworking of the piston 1, whereas a radially inner weld bead 6b formed on the radially inner joining surfaces 14a, 14b projects into the cooling channel.

The invention claimed is:

1. A piston for an internal combustion engine, comprising:
an upper piston part and a lower piston part that together delimit a circumferential cooling channel for receiving a cooling medium both radially inside and radially outside, the upper piston part and the lower piston part connected to one another via a radially outer weld connection and a radially inner weld connection, wherein the radially outer weld connection includes a radially outer weld bead that projects radially inwards into the cooling channel for forming a deflection element for the cooling medium received in the cooling channel;
wherein the radially outer weld bead defines a narrowing of the cooling channel that divides the cooling channel into a narrowing zone and into an axially upper channel zone and an axially lower channel zone, wherein the narrowing zone is arranged between the axially upper channel zone and the axially lower channel zone; and
wherein a radial width of the cooling channel at the narrowing amounts to maximally 50% of a maximum radial width of the cooling channel.

2. The piston according to claim 1, wherein the radially inner weld connection includes a radially inner weld bead extending radially towards the inside away from the cooling channel.

3. The piston according to claim 1, wherein the radially inner weld connection and the radially outer weld connection are arranged at the same axial height.

4. The piston according to claim 1, wherein the radially inner weld connection is arranged axially offset to the radially outer weld connection.

5. The piston according to claim 1, wherein:
the radially inner weld connection is arranged in a region of a piston crown, or
the radially inner weld connection is arranged in a region of a combustion bowl.

6. The piston according to claim 4, wherein the radially inner weld connection includes a radially inner weld bead, and wherein a first weld bead volume of the radially outer weld bead is larger than a second weld bead volume of the radially inner weld bead.

7. The piston according to claim 1, wherein the radially inner weld connection and the radially outer weld connection are arranged at the same height, the radially inner weld connection including a radially inner weld bead extending radially towards the inside away from the cooling channel, and wherein the narrowing zone is disposed radially between the radially inner weld bead and the radially outer weld bead.

8. The piston according to claim 1, wherein a volume of the axially upper channel zone amounts to at least 40% of a total volume of the cooling channel.

9. The piston according to claim 1, wherein the radial width of the cooling channel in the region of the narrowing amounts to maximally ⅓ of the maximum radial width of the cooling channel.

10. The piston according to claim 1, wherein the radially outer weld bead and a radially inner weld bead disposed at the radially inner weld connection are structured as deflection elements for the cooling medium present in the cooling channel.

11. An internal combustion engine for a motor vehicle, comprising:
at least one combustion chamber, and
a piston adjustably arranged in the at least one combustion chamber, the piston including an upper piston part and a lower piston part that together delimit a circumferential cooling channel for receiving a cooling medium both radially inside and radially outside, the upper piston part and the lower piston part connected to one another via a radially outer weld connection and a radially inner weld connection, wherein the radially outer weld connection includes a radially outer weld bead that projects radially inwards into the cooling channel for forming a deflection element for the cooling medium received in the cooling channel;
wherein the radially outer weld bead defines a narrowing of the cooling channel that divides the cooling channel into a narrowing zone and into an axially upper channel zone and an axially lower channel zone, wherein the narrowing zone is arranged between the axially upper channel zone and the axially lower channel zone; and
wherein a volume of the axially upper channel zone amounts to at least 40% of a total volume of the cooling channel.

12. A method for producing a piston, comprising:
a) providing a first blank and a second blank that each comprise a radially outer joining surface and a radially inner joining surface, and wherein on at least one of the two radially outer joining surfaces of the first and second blanks, a weld bead steering element is provided,
b) welding the first and second blanks at the radially inner and radially outer joining surfaces to form the piston such that during the welding process, at least on the two radially outer joining surfaces of the first and second blanks, a radially outer weld bead is formed, which is deflected from the weld bead steering element so that following the welding the radially outer weld bead projects radially to the inside into a cooling channel delimited by the first and second blanks;
wherein the radially outer weld bead defines a narrowing of the cooling channel that divides the cooling channel into a narrowing zone and into an axially upper channel zone and an axially lower channel zone, wherein the narrowing zone is arranged between the axially upper channel zone and the axially lower channel zone; and
wherein a radial width of the cooling channel at the narrowing amounts to maximally 50% of a maximum radial width of the cooling channel.

13. The method according to claim 12, wherein prior to the welding according to measure b), the two radially outer joining surfaces delimit a radially outer gap tapering radially to the outside away from a centre longitudinal axis of the piston or tapering radially to the inside towards the centre longitudinal axis of the piston, wherein the radially outer gap forms the weld bead steering element.

14. The method according to claim 12, wherein the weld bead steering element is formed by a recess provided in a region of the two radially outer joining surfaces or by a projection provided in the region of the two radially outer joining surfaces.

15. The method according to claim 12, wherein prior to the welding according to measure b), the two radially inner joining surfaces delimit a gap tapering radially to the outside away from a centre longitudinal axis of the piston or tapering radially to the inside towards the centre longitudinal axis of the piston, wherein the gap forms a second weld bead steering element.

16. The method according to claim 15, wherein a radially inner weld bead forms on the two radially inner joining surfaces during the welding process that is deflected from the second weld bead steering element so that after the welding the radially inner weld bead projects radially to the inside into a piston bowl of the piston or radially to the outside into the cooling channel.

17. The internal combustion engine according to claim 11, wherein the radially inner weld connection includes a radially inner weld bead projecting radially outwards into the cooling channel.

18. The internal combustion engine according to claim 11, wherein one of:
the radially inner weld connection and the radially outer weld connection are arranged at the same axial height of the piston; and
the radially inner weld connection is arranged axially offset to the radially outer weld connection.

19. The internal combustion engine according to claim 11, wherein a radial width of the cooling channel in a region of the narrowing amounts to maximally 50% of a maximum radial width of the cooling channel.

20. The internal combustion engine according to claim 11, wherein one of:
the radially inner weld connection is arranged in a region of a piston crown; and
the radially inner weld connection is arranged in a region of a combustion bowl.

* * * * *